UNITED STATES PATENT OFFICE.

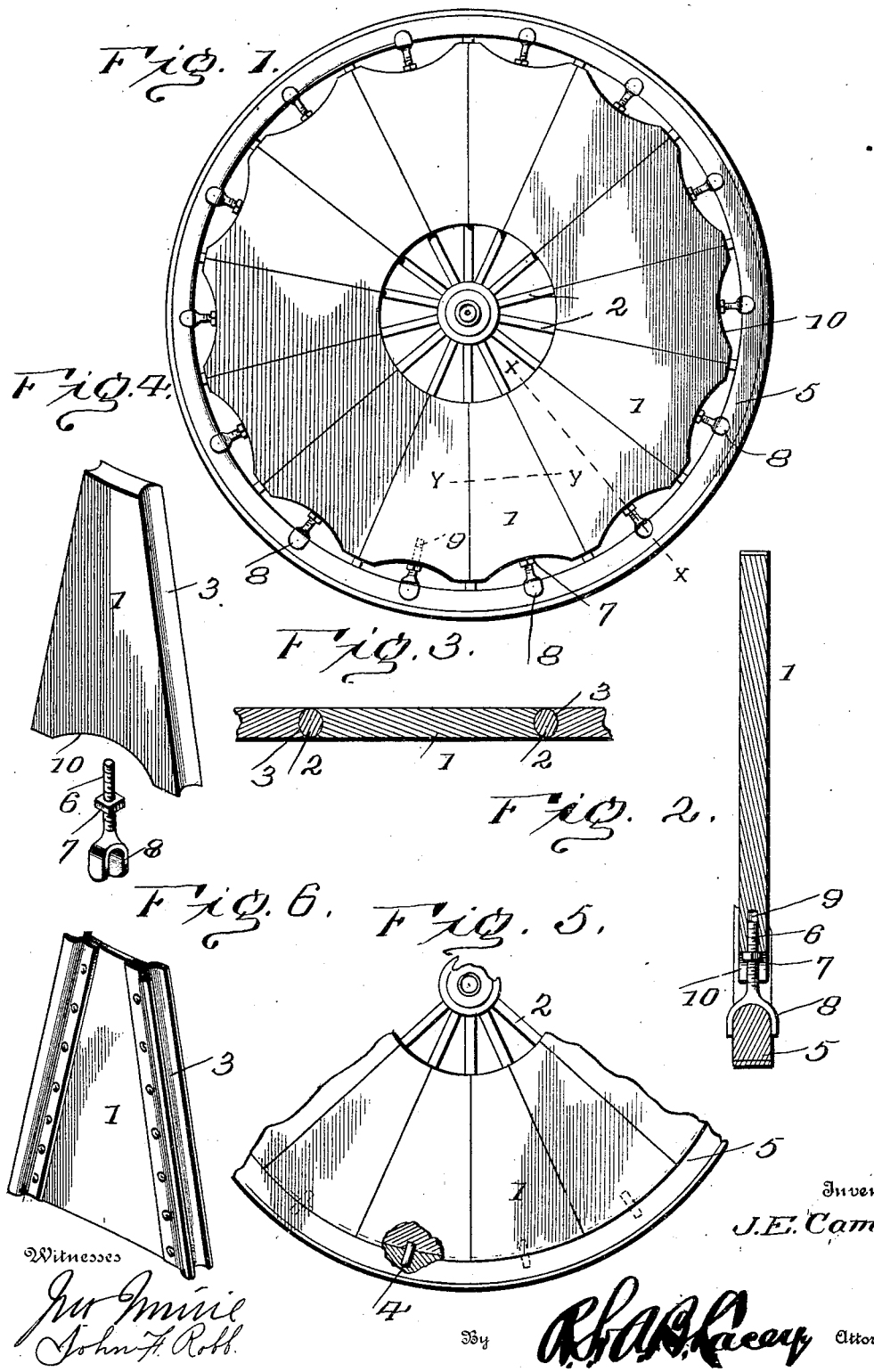

JULIAN E. CAMP, OF BROOKLYN, ILLINOIS.

VEHICLE-WHEEL.

SPECIFICATION forming part of Letters Patent No. 680,224, dated August 13, 1901.

Application filed January 18, 1901. Serial No. 43,780. (No model.)

*To all whom it may concern:*

Be it known that I, JULIAN E. CAMP, a citizen of the United States, residing at Brooklyn, in the county of Schuyler and State of Illinois, 5 have invented certain new and useful Improvements in Vehicle-Wheels; and I do hereby declare the following to be a full, clear, and exact description of the invention, such as will enable others skilled in the art to which it appertains to make and use the same.

It is well known that vehicles propelled over muddy roads will gather mud upon the wheels to such an extent as to detract materially from the progress of the carrier and appreciably add to the load, besides being objectionable, because of the injury to the paint, varnish, and finish and the unsightly appearance presented.

Observation has demonstrated that the mud accumulates upon the wheels from the following cause: As the wheel descends into the mud a portion thereof encircles the spoke and is lifted thereby. When this spoke again enters the mud in the next revolution of the wheel, the portion of mud previously lifted is pushed upward upon the spoke toward the hub and a new portion of mud is caused to adhere thereto. This operation is repeated for each spoke at each revolution of the wheel until a mass of mud heavier than the retaining power of the clench around the spokes can stand, when by its own weight the mud drops off and the process is repeated.

This invention aims to prevent the spoke from taking up the first portion of mud and obviate any clench which results in the creeping and accumulation of mud.

The desired results are attained by a filling-piece interposed between adjacent spokes, whereby the mud is cut and falls away from the sides of the wheel. This filling may be permanent; but it is preferred to have it readily detachable, so as to be removed in summer and dry seasons.

For a full description of the invention and the merits thereof, and also to acquire a knowledge of the details of construction of the means for effecting the result, reference is to be had to the following description and drawings hereto attached.

While the essential and characteristic features of the invention are necessarily susceptible of modification, still the preferred embodiment of the invention is illustrated in the accompanying drawings, in which—

Figure 1 is a side view of a vehicle-wheel embodying the invention. Fig. 2 is a section on the line X X of Fig. 1. Fig. 3 is a section on the line Y Y of Fig. 1. Fig. 4 is a detail perspective view of a filling-piece and jack. Fig. 5 is a modification. Fig. 6 is a further modification.

Corresponding and like parts are referred to in the following description and indicated in all the views of the drawings by the same reference characters.

The vital feature of this invention is a filling-piece 1, interposed between adjacent spokes 2 of the ordinary vehicle-wheel, said filling-piece extending from the rim to within a short distance of the hub and either touching the rim at its outer end or spaced a short distance therefrom, according to the special nature and adaptation of the invention. When the filling-piece is placed in position at the time of constructing the wheel, its outer end touches the inner edge of the rim, so as to be held in place thereby; but when the filling-piece is detachably fitted to the wheel its outer end is spaced a short distance from the rim as a result of making provision for inward movement of the filling-piece after being fitted between adjacent spokes, so as to seat the latter in the grooved edges 3 of the filling-piece.

Fig. 5 shows the filling-pieces held in place by the rim and forming a permanent part of the wheel, and in order to prevent lateral displacement and to strengthen the filling-pieces intermediate of their edges a dowel 4 is interposed between the filling-pieces and the rim 5.

In the form shown in Fig. 1 the filling-pieces are removably fitted between adjacent spokes and are held from lateral displacement by grooves 3 in their edges receiving the spoke. When placing the filling-pieces 1 in position, their outer ends touch or come very close to the inner edge of the rim 5, and one grooved edge 3 is fitted to one spoke and the other grooved edge permitted to clear the adjacent spoke when the filling-piece is in the plane of the wheel. An inward movement of the filling-piece toward the hub of the wheel causes the remaining grooved edge of the filling-piece to receive the companion spoke, as will be readily comprehended. Means are interposed between the outer ends of the filling-pieces and the rim 5 to prevent outward displacement or movement of the filling-pieces, and, as shown, these means consist of a jack comprising a threaded stem 6 and a nut 7. The outer end of the stem 6 is formed with a rest or head 8 to engage with the rim 5 and prevent lateral displacement of the jack, and the inner threaded end of the stem enters an opening 9, formed in the outer end of the filling-piece. The rest or head 8 is concave in its outer side to conform to the convexity of the rim 5 in transverse section, whereby lateral displacement thereof is prevented. The nut 7 bears against the outer end of the filling-piece and can be turned upon the threaded stem 6 to tighten or loosen said filling-piece to take up shrinkage and prevent any rattling of the filling-piece. In order that the distance between the rim 5 and the outer end of the filling-piece may be of a minimum extent, the outer end of the filling-piece is indented or depressed, as shown at 10, to receive the nut 7 and the rest or head 8. The grooves or seats 3 are of such depth relative to the spokes 2 as to admit of the meeting edges of adjacent filling-pieces coming close together, as indicated most clearly in Fig. 3. It is preferred to have the sides of the filling-pieces come about flush with the sides of the rim 5 and to construct the filling-pieces of wood; but within the spirit of the invention it is sufficient if the space between the spokes is filled, so as to prevent the clench of the mud around the spokes. Hence sheet metal or kindred material of a less thickness than the transverse extent of the rim 5 may be employed, as indicated in Fig. 6. Clips 11 may be advantageously employed to hold these filling-pieces in place, and their stems may be bolted or secured to the filling-pieces by machine-screws or analogous fastenings, which will admit of the filling-pieces being readily placed in position or removed at will.

Having thus described the invention, what is claimed as new is—

1. A vehicle-wheel having filling-pieces interposed between the outer portion of adjacent spokes to divide mud and prevent creeping and accumulation thereof upon the sides of the wheel, substantially as set forth.

2. In combination with a vehicle-wheel, filling-pieces detachably fitted between the outer portions of adjacent spokes and serving to prevent accumulation of mud, substantially in the manner specified.

3. In combination with a vehicle-wheel, filling-pieces having their longitudinal edges grooved and fitted between the outer portions of adjacent spokes and held from lateral displacement by the seating of the spokes in the grooved edges of the filling-pieces, substantially as set forth.

4. In combination with a vehicle-wheel, filling-pieces interposed between the outer portion of adjacent spokes, and jacks interposed between the outer ends of the filling-pieces and the rim of the wheel, substantially as set forth.

5. In combination with a vehicle-wheel, filling-pieces interposed between the outer portions of adjacent spokes and having openings in their outer end portions, and a jack interposed between each of the filling-pieces and the rim of the wheel and consisting of a threaded stem having its inner end fitted into the opening of the filling-piece, a head at the outer end of the threaded stem and fitted to the rim, and a nut mounted upon the threaded stem and adapted to exert an inward pressure against the filling-piece, substantially as set forth.

6. In combination with a vehicle-wheel, a filling-piece interposed between the outer portions of adjacent spokes and having its edges grooved and its outer end indented or depressed, and a jack interposed between the rim of the wheel and the outer end of the filling-piece, substantially as set forth.

7. In combination with a vehicle-wheel, a filling-piece interposed between the outer portions of adjacent spokes and having its longitudinal edges grooved, its outer end portion centrally depressed or indented and formed with an opening, a threaded stem having its inner end portion fitted loosely in the opening of the filling-piece and having a rest or head at its outer end concave in its outer face to receive the rim of the wheel, and a nut mounted upon the threaded stem and adapted to exert a pressure against the filling-piece, substantially as specified.

In testimony whereof I affix my signature in presence of two witnesses.

JULIAN E. CAMP. [L. S.]

Witnesses:
C. L. BESSELL,
FRANK MANLOVE.